US009029798B2

(12) United States Patent
O'Keefe

(10) Patent No.: US 9,029,798 B2
(45) Date of Patent: May 12, 2015

(54) ANTI-FOULING SURFACE, AND RADIATION SOURCE ASSEMBLY AND FLUID TREATMENT SYSTEM COMPRISING SAME

(75) Inventor: William Kevin O'Keefe, Guelph (CA)

(73) Assignee: Trojan Technologies (CA)

( * ) Notice: Subject to any disclaimer, the term of this patent is extended or adjusted under 35 U.S.C. 154(b) by 0 days.

(21) Appl. No.: 14/115,930

(22) PCT Filed: May 7, 2012

(86) PCT No.: PCT/CA2012/000410
§ 371 (c)(1),
(2), (4) Date: Feb. 28, 2014

(87) PCT Pub. No.: WO2013/037035
PCT Pub. Date: Mar. 21, 2013

(65) Prior Publication Data
US 2014/0191137 A1    Jul. 10, 2014

Related U.S. Application Data

(60) Provisional application No. 61/457,646, filed on May 6, 2011.

(51) Int. Cl.
*B32B 9/00* (2006.01)
*B05D 3/00* (2006.01)
*C02F 1/32* (2006.01)
*B08B 17/00* (2006.01)
*C09D 5/16* (2006.01)
*C02F 1/66* (2006.01)

(52) U.S. Cl.
CPC . *C02F 1/325* (2013.01); *C02F 1/66* (2013.01); *C02F 2201/3228* (2013.01); *C02F 2303/14* (2013.01); *C02F 2303/20* (2013.01);

(Continued)

(58) Field of Classification Search
USPC .............. 250/432 R; 428/702, 35.9, 331, 299
See application file for complete search history.

(56) References Cited

U.S. PATENT DOCUMENTS 7,326,330 B2    2/2008  Herrington et al.
7,425,272 B2    9/2008  Butters et al.
(Continued)

FOREIGN PATENT DOCUMENTS

CN    1215744    * 10/1997
JP    06-220654 A    8/1994
(Continued)

OTHER PUBLICATIONS

International Search Report for International Application No. PCT/CA/000410, with a mailing date of Sep. 17, 2012.

*Primary Examiner* — Phillip A Johnston
*Assistant Examiner* — Hsien Tsai
(74) *Attorney, Agent, or Firm* — Katten Muchin Rosenman LLP

(57) ABSTRACT

An element having an immersible portion for contact with an aqueous liquid, the immersible portion having a contact surface for contact with the aqueous liquid, the contact surface configured to have strong acidity, a radiation (e.g., ultraviolet radiation) source assembly, a radiation (e.g., ultraviolet radiation) source module and a fluid (e.g., water) treatment system incorporating this element applicable to any surface in contact with fluid that is susceptible to build-up of fouling materials. The embodiments obviate or mitigates the rate of accumulation of fouling on surfaces in contact with aqueous solution, such as the protective (e.g., quartz) sleeves in an ultraviolet radiation fluid treatment system, by modifying at least a portion of the surface of those sleeves in contact with fluid (e.g., water) to have an inherent strong surface acidity.

15 Claims, 5 Drawing Sheets

XPS survey scan of specimen 003

(52) U.S. Cl.
CPC ............ *C02F2303/22* (2013.01); *B08B 17/00* (2013.01); *C09D 5/1618* (2013.01)

(56) References Cited

U.S. PATENT DOCUMENTS

2004/0149963 A1* 8/2004 Sinko et al. .................... 252/500
2006/0172148 A1* 8/2006 Murayama et al. ........... 428/690
2006/0216623 A1* 9/2006 Matsumura et al. ........ 430/108.1
2009/0321365 A1* 12/2009 Eriksson et al. ............... 210/741
2010/0112378 A1* 5/2010 Deininger et al. ............. 428/702

FOREIGN PATENT DOCUMENTS

| | | | |
|---|---|---|---|
| JP | 2001-089867 A | 4/2001 | |
| WO | 2009-151638 A2 | 12/2009 | |
| WO | WO 2009151638 A2 * | 12/2009 | .............. A61L 27/30 |

* cited by examiner

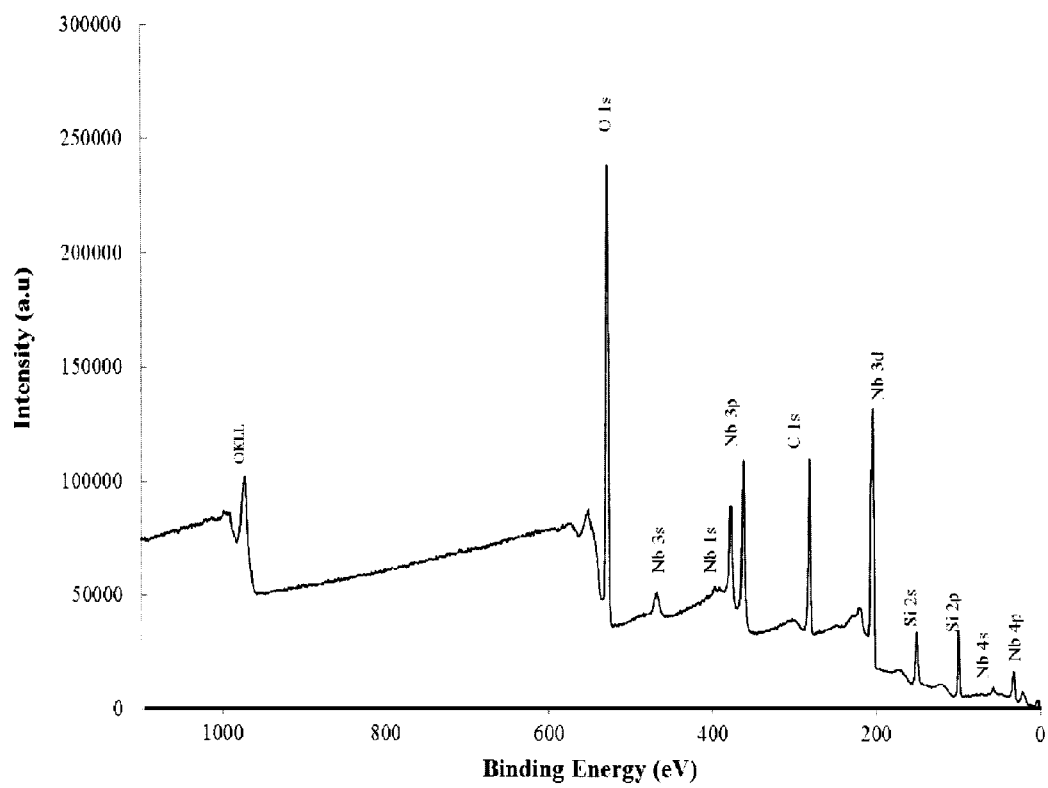
Figure 1 XPS survey scan of specimen 003

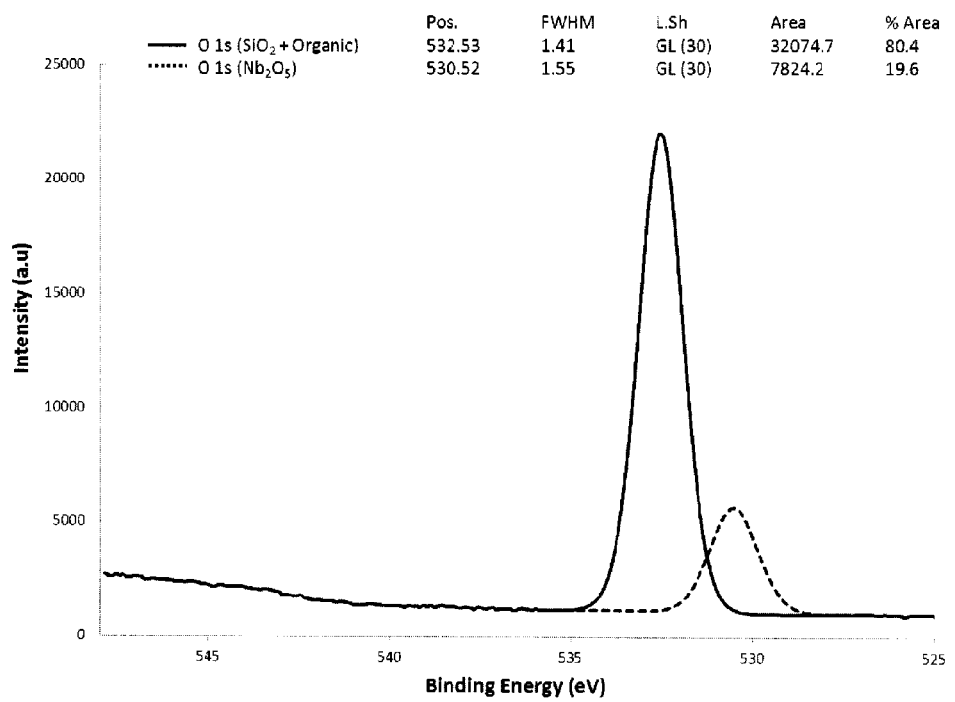
Figure 2a Oxygen 1s High resolution XPS spectra for specimen 004

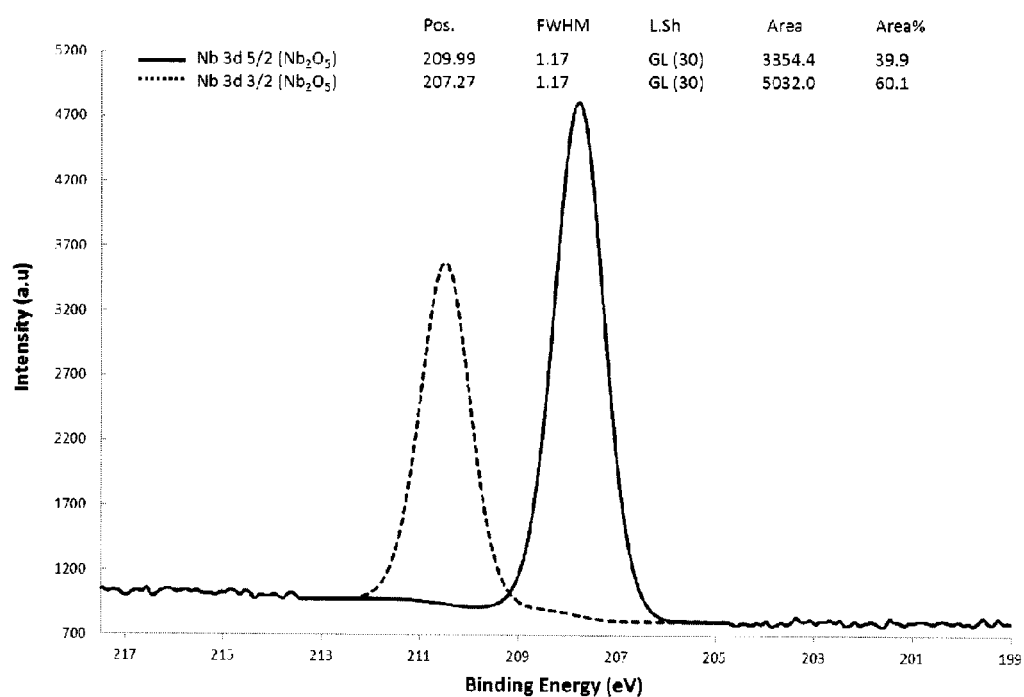
Figure 2b Nb 3d high resolutions XPS spectra for specimen 004

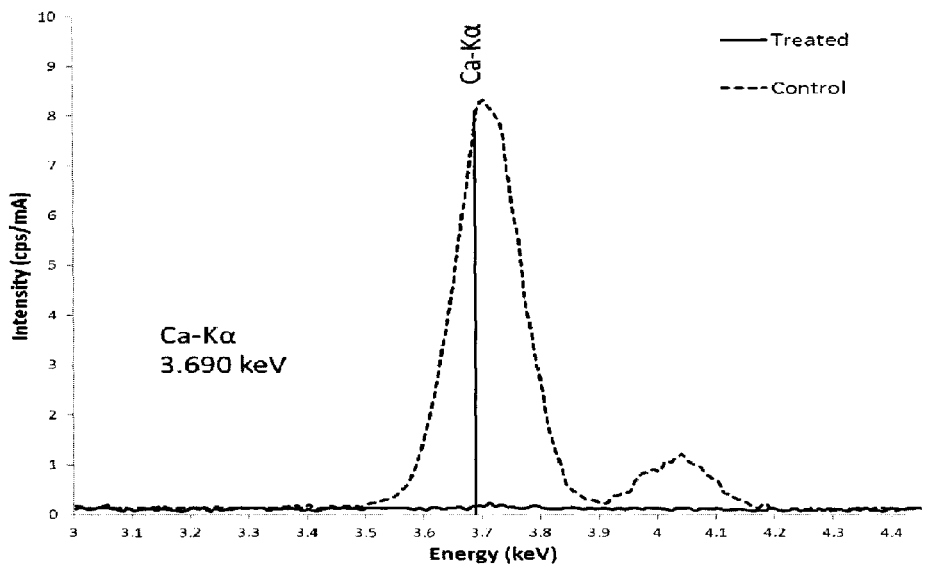
Figure 3 EDXRF analysis of fouled specimens 372 (control, dashed line) and 369 (treated, soild line) showing the Ca-Kα transition indicating the presence of calcium. It may be seen that the signal for calcium is much stronger on the control specimen, indicating a greater accumulation of calcium.

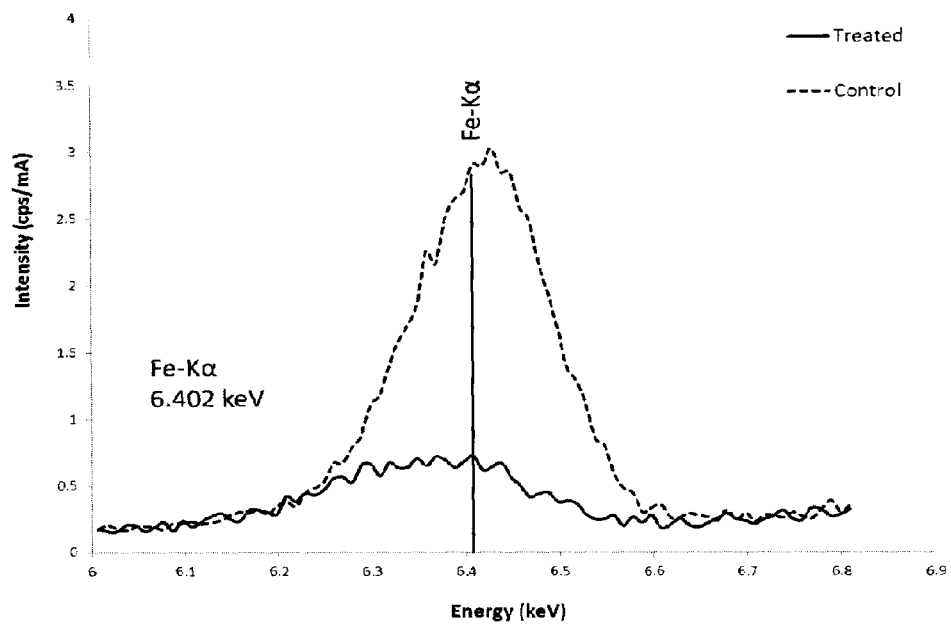
Figure 4 EDXRF analysis of fouled specimens 372 (control, dashed line) and 369 (treated, solid line) showing the Fe-Kα transition indicating the presence of iron. The control specimen has much more iron on the surface.

US 9,029,798 B2

ANTI-FOULING SURFACE, AND RADIATION SOURCE ASSEMBLY AND FLUID TREATMENT SYSTEM COMPRISING SAME

CROSS-REFERENCE TO RELATED APPLICATION

The present application claims the benefit under 35 U.S.C. §119(e) of provisional patent application Ser. No. 61/457,646, filed May 6, 2011, the contents of which are hereby incorporated by reference.

BACKGROUND OF THE INVENTION

1. Field of the Invention

In one of its aspects, the present invention relates to an antifouling surface—e.g., a quartz element having an antifouling surface. In another of its aspects, the present invention relates to a radiation source assembly comprising the antifouling surface. In yet another of its aspects, the present invention relates to a radiation source module comprising the antifouling surface. In yet another of its aspects, the present invention relates to a fluid treatment system comprising the antifouling surface. In another of its aspects, the present invention relates to a method of producing an antifouling surface—e.g., a quartz element having an antifouling surface. Other aspects of the invention will become apparent to those of skill in the art upon reviewing the present specification.

2. Description of the Prior Art

Fluid treatment systems are known generally in the art.

For example, U.S. Pat. Nos. 4,482,809, 4,872,980 and 5,006,244 [all in the name of Maarschalkerweerd and hereinafter referred to as the Maarschalkerweerd #1 Patents] all describe gravity fed fluid treatment systems which employ ultraviolet (UV) radiation.

Such systems include an array of UV lamp frames which include several UV lamps each of which are mounted within sleeves which extend between and are supported by a pair of legs which are attached to a cross-piece. The so-supported sleeves (containing the UV lamps) are immersed into a fluid to be treated which is then irradiated as required. The amount of radiation to which the fluid is exposed is determined by the proximity of the fluid to the lamps, the output wattage of the lamps and the fluid's flow rate past the lamps. Typically, one or more UV sensors may be employed to monitor the UV output of the lamps and the fluid level is typically controlled, to some extent, downstream of the treatment device by means of level gates or the like.

Depending on the quality of the fluid which is being treated, the sleeves surrounding the UV lamps periodically become fouled with foreign materials, inhibiting their ability to transmit UV radiation to the fluid. For a given installation, the occurrence of such fouling may be determined from historical operating data or by measurements from the UV sensors. Once fouling has reached a certain point, the sleeves must be cleaned to remove the fouling materials and optimize system performance.

If the UV lamp modules are employed in an open, channel system (e.g., such as the one described and illustrated in Maarschalkerweerd #1 Patents), one or more of the modules may be removed while the system continues to operate, and the removed frames may be immersed in a bath of suitable cleaning solution (e.g., a mild acid) which may be air-agitated to remove fouling materials. This practice was regarded by many in the field as inefficient, labourious and inconvenient.

In many cases, once installed, one of the largest maintenance costs associated with prior art fluid treatment systems is often the cost of cleaning the sleeves about the radiation sources.

U.S. Pat. Nos. 5,418,370, 5,539,210 and RE36,896 [all in the name of Maarschalkerweerd and hereinafter referred to as the Maarschalkerweerd #2 Patents] all describe an improved cleaning system, particularly advantageous for use in gravity fed fluid treatment systems which employ UV radiation. Generally, the cleaning system comprises a cleaning carriage engaging a portion of the exterior of a radiation source assembly including a radiation source (e.g., a UV lamp). The cleaning carriage is movable between: (i) a retracted position wherein a first portion of radiation source assembly is exposed to a flow of fluid to be treated, and (ii) an extended position wherein the first portion of the radiation source assembly is completely or partially covered by the cleaning carriage. The cleaning carriage includes a chamber and seals in contact with the first portion of the radiation source assembly. The chamber is supplied with a cleaning solution (typically an acidic cleaning solution) suitable for removing undesired materials from the first portion of the radiation source assembly.

The cleaning system described in the Maarschalkerweerd #2 Patents represented a significant advance in the art, especially when implemented in the radiation source module and fluid treatment system illustrated in these patents.

In recent years, there has been interest in the so-called "transverse-to-flow" fluid treatment systems. In these systems, the radiation source is disposed in the fluid to be treated in a manner such that the longitudinal axis of the radiation source is in a transverse (e.g., orthogonal vertical orientation of the radiation sources) relationship with respect to the direction of fluid flow past the radiation source. See, for example, any one of:

International Publication Number WO 2004/000735 [Traubenberg et al.];

International Publication Number WO 2008/055344 [Ma et al.];

International Publication Number WO 2008/019490 [Traubenberg et al.];

U.S. Pat. No. 7,408,174 [From et al.];

International Publication Number WO 10/069072 [Penhale et al.];

International Publication Number WO 10/102383 [Penhale et al.]; and

International Publication Number WO 11/014944 [Penhale et al.].

When these fluid treatment systems have been implemented there is an ongoing problem of build-up of fouling materials on the exterior surface of the radiation sources.

The prior art has focussed on this problem by allowing the fouling materials to build-up to a degree at which point the radiation source assemblies are removed for cleaning or an active cleaning system such as the one taught in the Maarschalkerweerd #2 Patents is used to remove the fouling materials by mechanical and/or chemical action.

While the cleaning system taught by the Maarschalkerweerd #2 Patents is a very significant advance in the art, there is room for improvement.

First, seal failure in the cleaning system taught by the Maarschalkerweerd #2 Patents can occur resulting in the loss of acidic cleaning fluid and a reduced capacity to remove the foulant as well as the introduction of the cleaning chemicals to the environment. Second, the cleaning system is relatively complex resulting in significant capital and operating costs associated with the equipment. Third, the mechanical cleaning equipment occupies space in the reactor which requires the UV lamps to have a minimum separation distance, which reduces the effectiveness of disinfection and lowers the efficiency of the ultraviolet radiation reactor. Fourth, the wiping action can cause scratches in the sleeves which may potentially promote fouling or lead to premature failure of the sleeve. Fifth, the moving parts required in the design may also lead to failure and maintenance requirements. Lastly, regardless of mechanical wiping, the sleeves ultimately must be removed for either cleaning and or replacement, which is time consuming and undesirable.

Therefore, a "passive cleaning" technique which provides continuous in situ cleaning without the use of mechanical devices and moving parts would be desirable.

U.S. Pat. No. 7,326,330 [Herrington et al. (Herrington)] teaches a passive cleaning technique wherein it is purported that biofilm formation and/or the deposition of fouling materials onto a quartz sleeve may be prevented by creating a locally low pH at the quartz sleeve. Apparently, this substantially increases the solubility of inorganic compounds (e.g., metal salts) which would otherwise precipitate onto the sleeve. The locally low pH is achieved by electrochemical means whereby a wire is wrapped about the quartz sleeve and connected to an electrical circuit such that the wire wrapped about the quartz sleeve becomes the anode. Inorganic compounds (e.g., metal salts) will precipitate at the cathode. The cathode may be de-scaled by cycling the polarity of the circuit.

However, the utility of the Herrington approach for prevention of ultraviolet radiation source assembly fouling is questionable. The locally low pH is believed to be created at the surface of the metal wire and not generally across the entirety of the quartz surface upon which fouling is occurring at the molecular level. In addition, the acidic species are subject to removal from the sleeve interface due to the strong convection environment in the reactor. Moreover, the Herrington approach produces scale on the cathode which requires cleaning—i.e., the build-up of fouling materials is simply transferred from one surface to another. Furthermore, the process requires the consumption of additional energy at great cost to achieve the passive cleaning process. Herrington suggests that diamonds may be used to improve electrical contact with the quartz surface—this is obviously an impractical and costly solution. It is also possible that the wrapping of a metal wire about a quartz sleeve may exacerbate fouling by trapping debris. Thus, it would be desirable have an approach that obviates the need of electrical contacts and the need for external energy supply by utilizing a quartz sleeve which possesses inherent strong surface acidity throughout the entirety of the surface thus obviating the need for an external means to generate acidity at the interfacial region.

U.S. Pat. No. 7,425,272 [Butters et al. (Butters)] teaches cleaning of ultraviolet radiation protective sleeves using an abrasive and optionally acidic slurry which passes through the reactor. It is taught that the abrasive material, in combination with locally high shear stress, physically removes the foulant from the protective sleeves. Optionally, the slurry may be made acidic by the mixing of an acid with the decontamination mixture thus enabling the release of the foulant by solubilizing the deposited metal and other oxide layers. In another embodiment, the abrasive material possesses photocatalytic properties, which promote oxidation reactions and is claimed to clean the UV sleeves. However, in each of these approaches, the abrasive material must be recovered from the decontaminated water, which requires material separation, material handling and the associated capital and operating costs. Most undesirable is the fact that the introduction of acid to the water will necessitate a downstream neutralization step or another means to recover the acid from the decontaminated water before discharge to the environment. In addition, since a large volumetric flow rate of water is processed in decontamination facilities, a large volumetric flow rate of strong acid would be required to achieve a sufficiently low pH to dissolve inorganic metal and other oxide layers.

Thus, despite the advances in the art, it would be highly advantageous to be able to configure the surface of the radiation source assembly (particularly the quartz sleeve or other protective surface for the ultraviolet radiation source) on which fouling materials build-up to obviate or mitigate the actual build-up of fouling materials. In other words, it would be desirable to have an approach that reduces the build-up of the fouling materials in the first instance. It would be further advantageous if the approach was relatively low cost and maintenance free for the user of the ultraviolet radiation fluid treatment system.

SUMMARY OF THE INVENTION

It is an object of the present invention to obviate or mitigate at least one of the above-mentioned disadvantages of the prior art.

It is an object of the present invention to provide a novel element that obviates or mitigates at least one of the above-mentioned disadvantages of the prior art.

Accordingly, in one of its aspects, the present invention provides an element having an immersible portion for contact with an aqueous liquid, the immersible portion comprising a contact surface which is for contact with the aqueous liquid, the contact surface configured to have strong acidity.

The invention also relates to a radiation (e.g., ultraviolet radiation) source assembly, a radiation (e.g., ultraviolet radiation) source module and a fluid (e.g., water) treatment system incorporating this element.

The present invention is applicable to any surface in contact with fluid that is susceptible to build-up of fouling materials. While embodiments of the invention will be described with reference to ultraviolet radiation fluid treatment systems (particularly the quartz or other protective sleeves used in those systems), it will be understood that the present invention is not to be limited to those embodiments.

Thus, the present inventor has discovered an approach which obviates or mitigates the rate of accumulation of fouling on surfaces in contact with aqueous solution, such as the protective (e.g., quartz) sleeves in an ultraviolet radiation fluid treatment system. This approach involves modifying at least a portion of the surface of those sleeves in contact with fluid (e.g., water) to have an inherent strong surface acidity. In some cases, this can obviate the need for complex mechanical cleaning equipment or at least result in a reduced frequency of mechanical cleaning.

In a preferred embodiment, a strong and permanent surface acidity is achieved via the immobilization of a solid acid in a relatively thin film (e.g., a thickness in the range of from about 1 molecular layer to about 1 µm). The solid acid may be either grafted or otherwise deposited directly onto the surface of the protective (e.g., quartz) sleeve or grafted or otherwise deposited onto one or more thin films which are deposited onto the protective (e.g., quartz sleeve).

While not wishing to be bound by any particular theory or mode of action, it is believed that the strong surface acidity shifts the local pH in the interfacial region between the surface of the protective (e.g., quartz) sleeve and the fluid (e.g., aqueous liquid) to a sufficiently low value that inorganic compounds (e.g., metal salts) will remain soluble and will not crystallize on the surface of the protective (e.g., quartz) sleeve. In addition, it is believed that the strong local acidity creates an environment hostile to microbial life forms and thus the protective (e.g., quartz) sleeve is imbued with an inherent antimicrobial property. In this way, it is believed that the build-up of fouling materials on the protective (e.g., quartz) sleeve is obviated or mitigated.

BRIEF DESCRIPTION OF THE DRAWINGS

Embodiments of the present invention will be described with reference to the accompanying drawings, wherein like reference numerals denote like parts, and in which:

FIG. 1 illustrates an XPS survey scan of a specimen produced in Example 1;

FIGS. 2a and 2b each illustrate a high resolution XPS survey scan of a specimen produced in Example 1; and FIGS. 3-4 each illustrate an EDXRF analysis of fouled specimens produced in Example 2.

DETAILED DESCRIPTION OF THE PREFERRED EMBODIMENTS

In one of its aspects, the present invention relates to an element having an immersible portion for contact with an aqueous liquid, the immersible portion comprising a contact surface which is for contact with the aqueous liquid, the contact surface configured to have strong acidity. Preferred embodiments of the element may include any one or a combination of any two or more of any of the following features:

- the contact surface comprises at least one layer comprising an acidic material
- the acidic material comprises a Lewis acid;
- the acidic material comprises a Bronsted acid;
- the acidic material comprises at least one metal oxide compound;
- the at least one metal oxide comprises at least one metal selected from Group 3 through Group 13 of the Periodic Table of Elements;
- the at least one metal oxide comprises at least one alkaline earth metal (Group 2 of the Periodic Table of Elements);
- the at least one metal oxide comprises at least one alkali metal (Group 1 of the Periodic Table of Elements);
- the at least one metal oxide comprises at least one metal selected from the Lanthanide Series of the Periodic Table of Elements;
- the at least one metal oxide comprises at least one metal selected from the Actinide Series of the Periodic Table of Elements;
- the acidic material comprises at least one metal oxide compound that exhibits acidic properties;
- the acidic material comprises at least one metal oxide compound that exhibits amphoteric properties;
- the at least one metal oxide compound is selected from the group consisting of $Cr_2O_3$, $CrO_3$, $Ta_2O_5$, $WO_3$, $W_2O_5$, $ZrW_xO_y$ (wherein x is 2 and y is 0.5 to 8), $V_2O_5$, $Nb_2O_5$, $MoO_3$, $Al_2O_3$, $TiO_2$, BeO, $Ga_2O_3$, $SiO_2$, ZnO, $La_2O_3$, $ThO_2$, CaO, $ZrO_2$ and mixtures thereof;
- the acidic material comprises an acidic transition metal oxide compound;
- the acidic material is a metal oxide containing at least one member selected from the group consisting of Fe, Ti, Zr, Hf, Sn, Si, Al and combinations thereof;
- the acidic material is a metal oxide containing at least one member selected from the group consisting of Fe, Ti, Zr, Hf, Sn, Si, Al and combinations thereof, the metal oxide having been treated with at least one of sulphate, tungstate and molybdate;
- the acidic material is selected from the group consisting of $SO_4/SnO_2$, $SO_4/ZrO_2$, $SO_4/HfO_2$, $SO_4/TiO_2$, $SO_4/Al_2O_3$, $SO_4/Fe_2O_3$, $MoO_3/ZrO_2$, $SO_4/SiO_2$, $WO_3/ZrO_2$, $WO_3/TiO_2$, $WO_3/Fe_2O_3$, $B_2O_3/ZrO_2$ and combinations thereof;
- the acidic material comprises a hydrate of $Nb_2O_5$;
- the acidic material comprises a water inert zeolite;
- the acidic material comprises a water inert zeolite exhibiting strong Bronsted acidity;
- the acidic material comprises a water inert zeolite exhibiting strong Bronsted acidity and having bridging hydroxyl moieties;
- the acidic material is selected from the group consisting of HZSM-5, HY, NaHY and combinations thereof;
- the contact surface has a Hammet acidity ($H_0$) of less than about 3.5;
- the contact surface has a Hammet acidity ($H_0$) of less than about 1.7;
- the contact surface has a Hammet acidity ($H_0$) of less than about −5.0;
- the contact surface has a Hammet acidity ($H_0$) of less than or equal to about −5.6;
- the acidic material is a heteropolyacid material;
- the heteropolyacid material comprises: (i) an addenda atom selected from the group consisting of W, Mo and V, (ii) at least one oxygen atom, (iii) at least one heteroatom selected from the p block (Group 13 through Group 18) of the Periodic Table of Elements;
- the heteropolyacid material comprises a structure having the formula $H_3AB_{12}O_{40}$, wherein A is the heteroatom and B is the addenda atom;
- the heteropolyacid material comprises 12-tungtophoshoric acid ($H_3PW_{12}O_{40}$) modified to contain a cation that confers water insolubility to the heteropolyacid material;
- the cation is cesium;
- the heteropolyacid material comprises the compound $H_{(3-x)}Cs_xPW_{12}O_{40}$ wherein $2<x<3$;
- the acidic material is a metal phosphate exhibiting acidic properties;
- the acidic material is a metal phosphate exhibiting amphoteric properties;
- the metal phosphate is selected from the group consisting of a niobium phosphate ($NbOPO_4$), a zirconium phosphate, a zirconium phosphonate, a lanthanum phosphate and combinations thereof;
- the metal phosphate comprises $NbOPO_4$;
- the contact surface further comprises a substrate to which the acidic material is secured;
- the contact surface further comprises a substrate to which the acidic material is directly secured;
- the contact surface further comprises a substrate to which the acidic material is indirectly secured (e.g., via one or more intermediate layers that may comprises a sol gel layer);
- the substrate is non-particulate;
- the substrate has a pair of opposed surfaces and the acidic material is secured to only one of the opposed surfaces;
- the substrate has a pair of opposed major surfaces and the acidic material is secured to only one of the opposed major surfaces;
- the substrate has a pair of opposed surfaces and the acidic material is secured to both of the opposed surfaces;

the substrate has a pair of opposed major surfaces and the acidic material is secured to both of the opposed major surfaces;

the substrate has a pair of opposed surfaces and the acidic material is secured to only one of the opposed surfaces;

the substrate has a low surface area;

the substrate has a surface area of less than about 1 $m^2/g$;

the substrate comprises a substantially radiation transparent material;

the substrate comprises a substantially ultraviolet radiation transparent material;

the substrate comprises a member selected from the group consisting of silica, quartz, metal, ceramic, glass, sapphire, an amorphous fluoropolymer, a copolyester material and combinations thereof the substrate comprises quartz;

the element is substantially radiation transparent;

the element is substantially ultraviolet radiation transparent; and/or the substrate comprises stainless steel.

The element described above may be incorporated into any of the following:

a radiation source comprising a surface configured to be immersed in an aqueous liquid, the surface comprising the element described above;

an ultraviolet radiation source comprising a surface configured to be immersed in an aqueous liquid, the surface comprising the element described above;

a radiation source module comprising at least one support element and at least one radation source described above;

a fluid treatment system comprising a fluid treatment zone in which is disposed at least one radation source described above;

a water treatment system comprising a fluid treatment zone in which is disposed at least one radation source as described above;

a fluid treatment system comprising a fluid treatment zone in which is disposed at least one radation source module as described above;

a water treatment system comprising a fluid treatment zone in which is disposed at least one radation source module as described above;

a radiation source assembly comprising a radiation source disposed in a protective sleeve, the protective sleeve having a surface configured to be immersed in an aqueous liquid, the surface comprising the element described above;

an ultraviolet radiation source assembly comprising an ultraviolet radiation source disposed in a protective sleeve, the protective sleeve having a surface configured to be immersed in an aqueous liquid, the surface comprising the element described above;

Broadly, the present invention relates to an element having a surface with inherently strong surface acidity. This acidity prevents or greatly reduces fouling of the surface when that surface is placed in an aqueous environment.

Generally, there are two kinds of acid sites in solids: Lewis acid sites and Bronsted acid sites. As is known by those of ordinary skill in the art, a Lewis acid site is one that contains an electron deficient metal centre capable of accepting electronic charge by donation from some substrate that would interact with the acid site. As is further known by those of ordinary skill in the art, a Bronsted acid site is one which is capable of donating a proton by transfer of the proton from the acid site to the substrate with which it is interacting. While a number of types of acids are useful (as set out above), a particularly preferred embodiment relates to the immobilization of a solid acid material (e.g., $Nb_2O_5$ nanoparticles) exhibiting strong Bronsted acidity imparted antifouling property to the surface. While not wishing to be bound by any particular theory or mode of action, it is believed that Bronsted acidity plays a role in imparting antifouling property to, for example, a fused silica substrate. These Bronsted acid sites in metal oxides are believed to be created by bridging hydroxyl groups. More specifically in the case of preferred embodiment of niobia nanoparticles, at the Bronsted acid sites are believed to be created by Nb—O—Nb and Si—O—Nb bridging groups.

Bronsted acid sites are believed to have the ability to create a pseudo-liquid which is believed to facilitate the antifouling property—for this reason Bronsted acid sites are preferred. As is known in the art Fourier-Transform InfraRed (FTIR) spectroscopy can distinguish between Lewis acid sites and Bronsted acid sites.

The acidity may be imparted to a substrate by grafting an antifouling acidic material to the substrate. While the following discussion focuses on a particularly preferred embodiment of the present invention (i.e., acidic nanoparticles of niobium (V) oxide on a quartz sleeve substrate), it will be appreciated that the present invention is not to be restricted to this specific embodiment.

When the substrate is a quartz sleeve used to house UV lamps in water treatment photoreactors, in a preferred embodiment, the acidic material is comprised of a thin film approximately 1 nm thick containing acidic nanoparticles of niobium (V) oxide. Using the present invention, the surface of the quartz sleeve may be functionalized with a permanent and inherently strong surface acidity. The locally low acidity at the solid-liquid interface is believed to inhibit inorganic compounds (e.g., metal salts) from forming crystals on the surface by shifting the chemical equilibrium and thus minimizing the thermodynamic driving potential for material precipitation and heterogeneous nucleation. Additionally, the strong surface acidity is believed to create an environment at the interface that is hostile to microbial life forms and thus imbue the quartz sleeve with an inherent anti-microbial property.

In a preferred embodiment, an acidic surface on the quartz sleeve may be generated by treatment of the quartz sleeve prior to use. A solid acid is immobilized either directly onto the quartz surface as a thin film, preferably but not limited to, one molecular layer thick (i.e. a single monolayer) or by immobilizing the acidic material onto or within one or more thin films of another material or materials—i.e., one or more intermediate layers. The film thickness and materials selection is such that the resultant UV transmittance is not substantially affected. The immobilization of a solid acid material and/or the grafting of acidic functional groups onto the surface is achieved by standard surface scientific techniques such as sol-gel synthesis and other grafting and surface attaching reactions that are within the purview of those of skill in the art. The choice of intermediate layer(s) can be selected to modify the surface area of the substrate.

The acidic property may be obtained through the use of various families of materials (set out above). Preferably, the acidic material may include an acidic metal oxide such as aluminum oxide, titanium dioxide or hydrated niobium (V) oxide (niobic acid), niobia monomers or dimers or other polymeric niobia compounds and niobium phosphate. The acidic phase may be comprised of a heteropoly acid material of various structures including but not limited to the Keggin, Dawson and Preyssler structures, such as 12-tungstophosphoric acid ($H_3PW_{12}O_{40}$) or more preferably heteropolyacids that have been rendered water insoluble via the integration of large cations such as cesium into the structure by proton exchange.

The acidic phase may be comprised of an acidic zeolite such as but not limited to ZSM-5 and zeolite beta and so on. The surface may be acid functionalized with sulfonic acid groups grafted via silane compounds or by other means within the purview of those of skill in the art, to silica or to another oxide, acidic zeolites, and so on.

Alternatively the acidic film may be an organic polymer film or membrane comprised of an acidic material such as the super acid NAFION or a polymeric film with acidic functional groups grafted or otherwise deposited to the polymer such as Amberlyst 15 for example. The acidic material would preferably exhibit strong Bronsted acidity through such functional groups including but not limited to carboxylic acid groups, sulphonic acid groups and the like as is within the purview of those of skill in the art as well as the bridging hydroxyl groups of metal oxide materials.

A conventional manner of characterizing the surface acidity of a solid material is by temperature programmed desorption (TPD) of a basic probe molecule such as ammonia or pyridine, which is first adsorbed onto the acidic surface to saturation. As the specimen is subsequently heated up, weakly adsorbed material is removed from the specimen and quantified. As the temperature rises further, more strongly adsorbed materials are desorbed.

In the TPD data, the desorption of the basic probe from a distinct kind of acid site will yield a peak distributed about a mean desorption temperature ($T_m$). The higher the mean temperature required to desorb the probe, the stronger the surface acidity. This desorption temperature is often correlated to the Hammet acidity function ($H_0$) defined in equation (1) using correlation of the form such as that in equation (2) where a and b are empirical constants. The Hammet acidity function is also more appropriate than the usual pH scale for very strong liquid acids that would yield a negative pH or for which nonideal solution behavior may occur.

$$H_0 = -\log_{10}\left(a_H + \frac{\gamma_B}{\gamma_{BH^+}}\right) \quad (1)$$

$$H_0 = a + \frac{b}{T_m} \quad (2)$$

Quantisation of the surface acidity by TPD alone has proven to be challenging for very low surface area materials such as quartz sleeve substrates (a preferred substrate material). However, it has been reported in the scientific literature that hydrated niobium (V) oxide exhibits a surface acidity of $H_0 = -5.6$. [K. Tanabe (2003), *Catal. Today*, 78, 65].

Accordingly, in a preferred embodiment, the acidic surface of the substrate should exhibit Bronsted acidity with a Hammet acidity of $H_0 < 3.5$, more preferably $H_0 < 1.7$, even more preferably $H_0 < -5$ and most preferably $H_0 \leq -5.6$.

Although the a highly preferred application of the present invention pertains to the suppression of foulant accumulation on quartz sleeves of ultraviolet radiation fluid (e.g., water) treatment systems, it should be understood that the present invention may also be utilized for the suppression of foulant accumulation or biofilm formation in other applications, such as, for example: the accumulation of foulant on heat transfer surfaces in heat exchangers and steam generators; on the walls and other submerged surfaces of bioreactors and other industrial process equipment and piping; on other glass surfaces including lenses, and sensors; on polymeric or ceramic surfaces such as membranes and the like. Consequently, the substrate upon which the acidic film is grafted may be comprised of carbon, a metal or metal alloy, a ceramic or a synthetic or natural polymeric material or some other composite material.

Embodiments of the invention will be described with reference to the following non-limiting examples which should not be used to construe or limit the scope of the invention.

Example 1

Preparation Of An Acid Functionalized Quartz Surface

Two coupons (1 inch×1 inch×1 mm) made of GE 214 quartz (fused silica) (Pelco International, p/n 26013) were chemically cleaned by immersion in toluene for 20 minutes in a manner that exposed both major surfaces to the fluid. The specimens were then rinsed with anhydrous 2-propanol and dried. The specimens were similarly immersed in hydrochloric acid, 10% (v/v) for 20 minutes and subsequently rinsed with deionised water and then with 2-propanol. The specimens were then immersed in toluene again for 20 minutes and subsequently rinsed thoroughly with 2-propanol.

The specimens were then immobilized in a reactor and activated at 120° C. for 2 hours in the presence of air (ultra zero gas) flowing over the specimens. After the reaction was completed, the reactor was cooled to room temperature, isolated and transferred into a glove box without exposing the specimens to the ambient. The glove box was purged several times using ultra high purity nitrogen to create an inert environment. The specimens, henceforth denoted specimen 003 and specimen 004 were immersed in solutions of approximately 0.05 and 0.025 mol/L respectively of niobium (V) ethoxide in n-hexane solvent. The anhydrous n-hexane solvent was further dried prior to use by 5A molecular sieves that had been activated at approximately 350° C. for 3 hours. The specimens were immersed in the precursor solution for a period of 2 hours, then subsequently rinsed in n-hexane solvent and dried overnight under vacuum (without exposure of the specimens to the ambient at any point during the synthesis).

The specimens were then immobilized in the reactor while in inert environment. The reactor was isolated and transferred to its apparatus. The specimens were heated to 200° C. in the presence of flowing UHP nitrogen and retained at this reaction temperature for 2 hours. The reactor was then cooled to 100° C. and the gas flow was switched from UHP nitrogen to air (ultra zero gas). The specimens were retained under these reaction conditions for 2 hours to complete the synthesis.

The 2 specimens were recovered and characterized by X-ray photoelectron spectroscopy (XPS) and by atomic force microscopy. High resolution and low resolution XPS survey scans were conducted. The XPS spectra were collected using a Kratos AXIS Ultra XPS from an area approximately 700× 400 microns in size, using a monochromatised AlKα X-ray beam. The results of the XPS survey scan for specimen 003 are illustrated in FIG. 1. The results of the XPS analysis confirmed the presence of the niobium oxide overlayer in both specimens. High resolution XPS scans (FIGS. 2a and 2b) revealed that the niobium was in the +5 oxidation state, indicating the presence of $Nb_2O_5$. The thicknesses of the niobium oxide overlayers of specimens 003 and 004 were determined from the XPS data using the method of P. J. Cumpson; [P. J. Cumpson (2000) *Surf Interface Anal.* 29, 403.] and were found to be 1.2 and 0.4 nm respectively.

The two specimens were subjected to ex situ AFM analysis. The specimens were imaged using the dynamic force mode of a Park Systems XE-100 AFM. A silicon cantilever with a nominal spring constant of 40 N/m was used. The nominal radius of the AFM probe tip apex was 10 nm. The AFM images confirmed the presence of the niobium oxide nanoparticles and significantly, revealed that the surface consisted of highly dispersed nanoparticles that were uniformly distributed over the surface of the quartz rather than in large agglomerates.

Example 2

Fouling Study In A Laboratory Apparatus

Six research specimens consisting of GE214 quartz coupons were acid functionalized as described in example 1 in a manner yielding highly dispersed niobium oxide nanoparticles over the quartz surface with overlayer thicknesses of approximately 1 nm. Four untreated but chemically cleaned quartz coupons were used as control specimens. The UV transmittance (UVT) of monochromatic light of 254 nm was measured at 20 locations through all 10 specimens using a Varian Cary 100 UV-Visible (UV-Vis) spectrophotometer equipped with an integrating sphere (Labsphere, North Sutton, N.H., USA). The 10 specimens were subsequently immobilized within 10 individual flow cells with calming zones of 20 hydraulic diameters upstream and 10 hydraulic diameters downstream of the quartz specimens, to ensure fully developed turbulent flow through the duct of the flow cell.

The specimens were exposed to a proprietary synthetic fouling water at a Reynolds number of 12000 while being simultaneously irradiated by a mercury vapor lamp at 254 nm for an exposure time of 70.5 hours. After this time, the UV lamp was de-energized and the feed pump disabled. The specimens were rinsed, first with 200 litres of tap water and then by immersion in deionised water. The specimens were dried overnight under vacuum. Quantitative chemical analyses of the fouled surfaces were obtained by energy dispersive x-ray fluorescence (EDXRF) spectroscopy using a Rigaku NEX CG EDXRF spectrometer. The UVT of monochromatic light at 254 nm of the fouled specimens were ascertained by UV-Vis spectroscopy as described previously. A second experiment was conducted to repeat the first experiment and a third experiment was conducted with a much longer exposure time (96 hours).

The results of the UV-V is spectroscopy (Table 1) showed that all of the control specimens had fouled significantly as evidenced by substantial decreases in the UVT of monochromatic light at 254 nm while all of the treated specimens did not foul at all with the exception of perhaps one (#321) that lost 1.4% UVT, which is perhaps within the limits of accuracy of the instrument. In contrast the control specimens lost 3 to 13% UVT. The UVT of the treated specimens were typically slightly higher at the end of the experiment than at the beginning, suggesting the surfaces were self-cleaning and likely due to the loss of residual carbon deposits from the synthesis. The results of the EDXRF analyses demonstrate conclusively that significant accumulation of calcium and iron were present on the control specimens but were not observed on the treated specimens. Representative EDXRF spectra for a control and treated specimen superimposed on each other are illustrated in FIGS. 3 and 4, which show the EDXRF signatures for calcium and iron respectively. Significant peaks associated with calcium and iron were observed for the control specimens while these peaks were not observed for the treated specimens. Not shown in the figures, a significant accumulation of magnesium was observed on the control specimens but not detected in the treated specimens. These results conclusively demonstrate that inorganic scaling compounds accumulated on the control specimens while their accumulation was fully suppressed by the presence of the niobium oxide nanoparticles in the treated specimens.

While this invention has been described with reference to illustrative embodiments and examples, the description is not intended to be construed in a limiting sense. Thus, various modifications of the illustrative embodiments, as well as other embodiments of the invention, will be apparent to persons skilled in the art upon reference to this description. It is therefore contemplated that the appended claims will cover any such modifications or embodiments.

All publications, patents and patent applications referred to herein are incorporated by reference in their entirety to the same extent as if each individual publication, patent or patent application was specifically and individually indicated to be incorporated by reference in its entirety.

TABLE 1

Results of the UV-Vis spectroscopy analyses of the fouled specimens showing the change in transmittance at 254 nm after exposure to a synthetic fouling water for 70.5 hours.

| Specimen ID | Description | Exposure Time (hr) | Change in transmitance (% UVT) |
|---|---|---|---|
| 357 | control | 70.5 | −4.5 |
| 358 | control | 70.5 | −5.7 |
| 371 | control | 70.5 | −3.2 |
| 372 | control | 70.5 | −4.9 |
| 368 | treated | 70.5 | 5.6 |
| 369 | treated | 70.5 | 0.8 |
| 370 | treated | 70.5 | 4.2 |
| 349 | treated | 70.5 | 5.8 |
| 350 | treated | 70.5 | 6.0 |
| 351 | treated | 70.5 | 4.9 |
| 317 | treated | 72 | 0.7 |
| 318 | treated | 72 | 1.7 |
| 319 | treated | 72 | 2.8 |
| 321 | treated | 72 | −1.4 |
| 322 | treated | 72 | 2.3 |
| 323 | treated | 72 | 2.4 |
| 325 | control | 72 | −7.8 |
| 326 | control | 72 | −10.6 |
| 327 | control | 72 | −8.0 |
| 328 | control | 72 | −6.2 |
| 333 | treated | 96 | 0.0 |
| 334 | treated | 96 | 2.5 |
| 336 | treated | 96 | 1.7 |
| 337 | control | 96 | −4.2 |
| 338 | control | 96 | −12.5 |
| 339 | control | 96 | −7.6 |
| 340 | control | 96 | −13.1 |
| 341 | treated | 96 | 5.8 |
| 343 | treated | 96 | 5.1 |
| 344 | treated | 96 | 0.0 |

What is claimed is:

1. An ultraviolet radiation fluid treatment element configured to inhibit fouling materials in the fluid from building up on a contact surface of the element, comprising:
    an ultraviolet radiation source; and
    ultraviolet transparent protective structure adjacent the ultraviolet radiation source and having an immersible portion for contact with the fluid, the immersible portion comprising the contact surface which is configured for contact with the fluid,
    the contact surface being configured to have immobilized on an outer fluid-contacting surface thereof a solid film having strong Bronsted acidity and configured to inhibit build-up of the fouling material on the contact surface.

2. The element defined in claim 1, wherein the contact surface comprises at least one layer comprising a Bronsted acidic material.

3. The element defined in claim 2, wherein the Bronsted acidic material comprises at least one metal oxide compound selected from the group consisting of $Ta_2O_5$, $WO_3$, $W_2O_5$, $ZrW_xO_y$ (wherein x is 2 and y is 0.5 to 8), $Nb_2O_5$, $MoO_3$, and mixtures thereof.

4. The element defined in claim 2, wherein the acidic material comprises a hydrate of $Nb_2O_5$.

5. The element defined in claim 1, wherein the contact surface has a Hammet acidity ($H_0$) of less than about 3.5.

6. The element defined in claim 1, wherein the contact surface has a Hammet acidity ($H_0$) of less than about 1.7.

7. The element defined in claim 1, wherein the contact surface has a Hammet acidity ($H_0$) of less than about −5.0.

8. The element defined in claim 1, wherein the contact surface has a Hammet acidity ($H_0$) of less than or equal to about −5.6.

9. The element defined in claim 2, wherein the contact surface further comprises a substrate to which the acidic material is secured.

10. The element defined in claim 9, wherein the substrate comprises a substantially radiation transparent material.

11. The element defined in claim 9, wherein the substrate comprises a member selected from the group consisting of silica, quartz, metal, ceramic, glass, sapphire, an amorphous fluoropolymer, a copolyester material and combinations thereof.

12. An ultraviolet radiation source configured to treat an aqueous liquid having fouling material therein, comprising:
    a radiation source configured to emit the ultraviolet radiation; and
    a radiation source protective structure having a surface configured to be immersed in the aqueous liquid, the surface comprising an element having an immersible portion for contact with the aqueous liquid, the immersible portion comprising a contact surface which is for contact with the aqueous liquid, the contact surface having immobilized on an outer aqueous liquid-contacting surface thereof a solid strong Bronsted acid configured to retard build-up of the fouling material on the contact surface.

13. A water treatment system comprising a fluid treatment zone in which is disposed at least one radiation source as defined in claim 12.

14. An ultraviolet radiation source assembly configured to treat an aqueous liquid having fouling material therein, comprising:
    an ultraviolet radiation source disposed in a protective sleeve;
    the protective sleeve having a surface configured to be immersed in the aqueous liquid, the surface comprising an element having an immersible portion for contact with an aqueous liquid, the immersible portion comprising a contact surface which is for contact with the aqueous liquid,
    the contact surface having immobilized thereon a solid film of strong Bronsted acidity configured to lower the pH at an interfacial region between the contact surface and the aqueous liquid to a sufficiently low value such that at least a portion of the inorganic compounds in the aqueous liquid remain soluble and are inhibited from crystallizing on the contact surface.

15. The element defined in claim 2, wherein the Bronsted acid is selected from the group consisting of $SO_4/SnO_2$, $SO_4/ZrO_2$, $SO_4/HfO_2$, $SO_4/TiO_2$, $SO_4/Al_2O_3$, $SO_4/Fe_2O_3$, $MoO_3/ZrO_2$, $SO_4/SiO_2$, $WO_3/ZrO_2$, $WO_3/TiO_2$, $WO_3/Fe_2O_3$, $B_2O_3/ZrO_2$ and combinations thereof.

* * * * *